ELECTRICAL COMPONENT HOLDER

Filed June 23, 1964

John W. Rogers
Armand J. Viscosi,
*INVENTORS.*
Harry M. Saragovitz
*BY* Edward J. Kelly
Herbert Berl
James T. Deaton United States Patent Office 3,222,448
Patented Dec. 7, 1965

3,222,448
ELECTRICAL COMPONENT HOLDER

John W. Rogers, Lynn, and Armand J. Viscosi, Methuen, Mass., assignors, by mesne assignments, to the United States of America as represented by the Secretary of the Army Filed June 23, 1964, Ser. No. 377,432
4 Claims. (Cl. 174—35)

Figure 2:
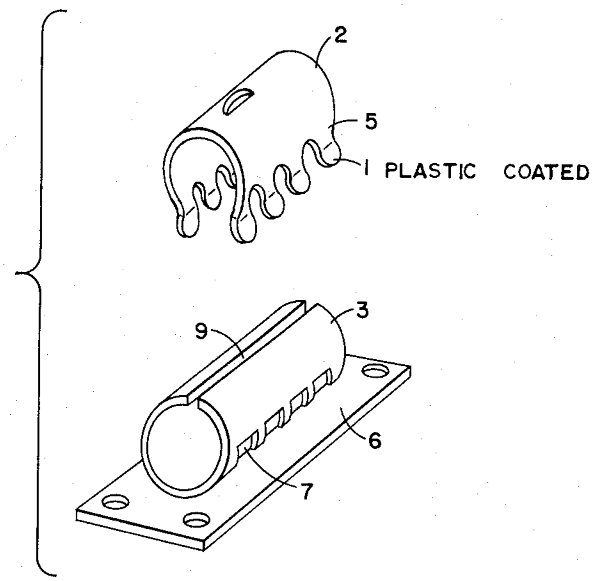

This invention relates to an electrical component holder or clip. Electrical component holders or clips of this type are used to support electronic tubes, capacitors, resistors and the like, on an electrical chassis.

In the prior art device, the electrical component holders have been made of all metal and designed to hold components by spring pressure. Major disadvantages to this all metal clip include the tendency of the clip to cut into electrical leads and adjacent components, damaging them and shorting out costly equipment. Prior clips also have relatively high microphonic sound levels due to, metal to metal contact, and such clips are more susceptible to separation under vibration.

Therefore, it is an object of this invention to eliminate sharp edges on component clips which cut into electrical leads and adjacent components at the time of installation or when equipment is vibrating.

Another object of this invention is to reduce microphonic sounds by eliminating metal to metal contact in component clips between the clip fingers and the base.

A further object of this invention is to improve gripping of a component by coating, with resilient or semi-rigid plastic or rubber, the tips of spring fingers which clamp against a metal base.

Yet another object of this invention is to increase the holding power of a clip through increased spring pressure.

A still further object of this invention is to provide a clip which has greater ability to resist vibratory forces which tend to separate the clip from the base.

In the missile industry, the need has arisen for an electrical component holder which is capable of overcoming the deficiencies set forth above relative to the prior art devices and of accomplishing the objects set forth supra. With the above need at hand, we have discovered that by making the spring clip with fingers and coating the fingers with a resilient semi-rigid coating, the above set forth objects may be accomplished.

Figure 1:
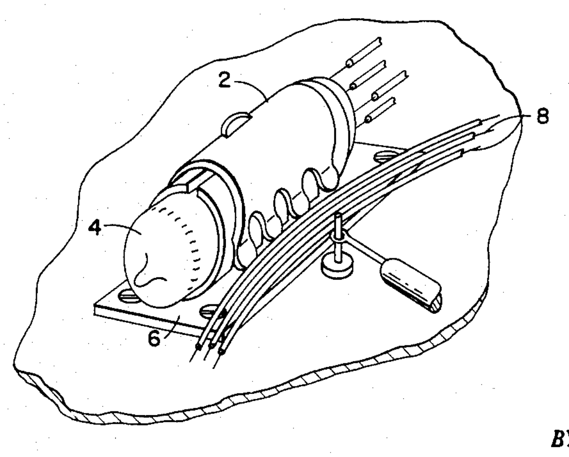

The invention may be better understood by referring to the drawing forming a part of this specification, and in which like numerals are employed to designate corresponding parts throughout the same, and wherein:

FIGURE 1 is a perspective view showing the relationship of the electrical component holder to other electrical wiring, and FIGURE 2 is an exploded perspective view showing details of a spring clip and base according to the invention.

In the drawing, wherein for the purpose of illustration is shown a preferred embodiment of our invention, numeral 3 designates a base which is made from ductile metal and has high thermal conductivity. In addition, base 3 may be coated with black opaque paint to dissipate heat. Base 3 is made with a slit type opening 9 and is rigidly attached to support chassis member 6 by riveting or welding at a position substantially opposite said opening. An electrical component 4, such as a tube, capacitor or resistor is inserted in base 3, and the sides of base 3 are pressed firmly against the side of component 4.

A metal spring clip 2 includes spring fingers 5 which are coated at tips 1 by a resilient or semi-rigid plastic or rubber coating. This coating of tips 1 increases the spring pressure exerted by fingers 5 and increases the gripping action of the fingers. The spring pressure exerted by fingers 5 is increased by the fact that the coating renders the fingers more rigid, and the gripping action is increased due to the gripping characteristics of the coating material.

When spring clip 2 is pressed over base 3, resilient tips 1 are seated in indentations 7 of base 3 to firmly clamp and hold the electrical component 4 in place. Since metal tips 1 are coated, such tips will not cut adjacent electrical leads 8 when pressing spring clip 2 onto base 3. Resiliently coated tips 1 which coact with indentations 7 will dampen the vibrational effects of the clips relative to the base, and substantially dampen microphonic sounds which are normally produced as a result of metal to metal vibrational contact between the clip fingers and base.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

We claim:

1. An electrical component holder including: a support member; a base member connected to said support member so as to define a plurality of sides, each of said sides having a plurality of indentations therein; an electrical component mounted between the sides of said base member and substantially surrounded by the base member; and a spring clip mounted on said base member and including a plurality of spring fingers, each of said fingers having a tip which is completely coated with a resilient semi-rigid material and is received in one of said plurality of indentations, whereby the electrical component will be firmly held in position, and said resilient coating on said fingers will substantially dampen vibration of said base member relative to said clip.

2. An electrical component holder as set forth in claim 1, wherein said base member is made of ductile metal to conduct heat from the electrical component.

3. An electrical component holder including: a support member; a base member connected to said support member, said base member being substantially cylindrical and split opposite the connection of said base member to said support member so as to define two sides, each of said sides having a plurality of indentations in the outer periphery thereof and located near the connection of said base member to said support member, the inner surface of said base member being adapted to closely surround an electrical component; and a substantially cylindrical metal spring clip having a plurality of fingers and mounted on said base member, said fingers being received in said plurality of indentations and each finger having a semi-rigid plastic coating completely covering the tip thereof for coaction with the indentations, whereby the spring clip will be freed from sharp edges at the tips of said fingers and said clip will be freed from substantial vibration relative to said base member.

4. An electrical component holder as set forth in claim 1, wherein said holder is mounted adjacent electrical leads which are subject to contact by said fingers when said clip is mounted on said base, the coating on said tips preventing cutting of insulation on the electrical leads.

References Cited by the Examiner

UNITED STATES PATENTS 3,020,451 2/1962 McAdam.

OTHER REFERENCES

Augat Bros. Inc.: Advertisement "Elastaccamp," Augat Bros. Inc., Mar. 25, 1959.

IERC Co.: Advertisement, Electronic Buyers' guide, June 1957, page 576.

ROBERT K. SCHAEFER, *Acting Primary Examiner.*

JOHN F. BURNS, *Examiner.*